United States Patent
Kim et al.

(10) Patent No.: US 11,514,338 B2
(45) Date of Patent: Nov. 29, 2022

(54) ACTIVE ACTIVITY PLANNING SYSTEM AND METHOD FOR SUPPORTING TEMPORAL CONSTRAINTS

(71) Applicant: Robert Bosch GmbH, Stuttgart (DE)

(72) Inventors: Doo Soon Kim, San Jose, CA (US); Fuliang Weng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 1007 days.

(21) Appl. No.: 16/312,281

(22) PCT Filed: Jun. 27, 2017

(86) PCT No.: PCT/EP2017/065802
§ 371 (c)(1),
(2) Date: Dec. 20, 2018

(87) PCT Pub. No.: WO2018/002020
PCT Pub. Date: Jan. 4, 2018

(65) Prior Publication Data
US 2019/0197417 A1    Jun. 27, 2019

Related U.S. Application Data

(60) Provisional application No. 62/354,875, filed on Jun. 27, 2016.

(51) Int. Cl.
G06F 16/9038    (2019.01)
G06N 5/04    (2006.01)
(Continued)

(52) U.S. Cl.
CPC ............. G06N 5/04 (2013.01); G06F 16/908 (2019.01); G06F 16/9038 (2019.01); G06F 16/90335 (2019.01); G06Q 10/04 (2013.01)

(58) Field of Classification Search
CPC . G06N 5/04; G06F 16/90335; G06F 16/9038; G06F 16/908; G06Q 10/04
See application file for complete search history.

(56) References Cited

U.S. PATENT DOCUMENTS

2008/0104071 A1    5/2008    Pragada et al.
2009/0164441 A1*   6/2009    Cheyer ................. G06F 16/334
(Continued)

OTHER PUBLICATIONS

Samiha Samrose et al., Efficient Computation of Group Optimal Sequenced Routes in Road Networks, Jun. 1, 2015, IEEE Computer Society, pp. 122-127 (Year: 2015).*
(Continued)

Primary Examiner — Tam T Tran
(74) Attorney, Agent, or Firm — Maginot, Moore & Beck LLP

(57) ABSTRACT

An activity planning system comprises a knowledge base, a query processor, and a temporal reasoner. A query including temporal constraints is input into the query processor. The query processor converts the query into a formal representation. The formal representation is a formal graphical semantic representation grounded on an ontology defined in the knowledge base. The temporal reasoner processes the query representation output by the query processor against the knowledge base which defines a set of object. For each object, the temporal reasoner produces a normalized score from 0 to 1 to indicate the degree of how likely the object satisfies the temporal constraints imposed by the query.

5 Claims, 4 Drawing Sheets

(51) Int. Cl.
  *G06Q 10/04* (2012.01)
  *G06F 16/903* (2019.01)
  *G06F 16/908* (2019.01)

(56) References Cited

U.S. PATENT DOCUMENTS

2012/0278273 A1* 11/2012 Fang .................. G06N 5/04
  706/55
2015/0241223 A1* 8/2015 Davidson ............... G01C 21/32
  701/532
2016/0034462 A1* 2/2016 Brewer ............... G06F 16/9024
  707/734
2018/0112995 A1* 4/2018 Bortolussi .......... G01C 21/3679

OTHER PUBLICATIONS

Michele Ruta et al., Indoor/ Outdoor mobile navigation via knowledge-based POI discovery in augmented reality, Dec. 1, 2015, IEEE Computer Society, pp. 26-30 (Year: 2015).*
International Search Report corresponding to PCT Application No. PCT/EP2017/065802, dated Aug. 14, 2017 (English language document) (3 pages).
Dechter, Rina et al., Temporal constraint networks, Artificial Intelligence, 49(1-3): 61-95, May 1991.
Vidal, Thierry et al., Handling contingency in temporal constraint networks: from consistency to controllabilities, Journal of Experimental and Theoretical Artificial Intelligence, 11:23-45, 1999.

\* cited by examiner

ACTIVE ACTIVITY PLANNING SYSTEM AND METHOD FOR SUPPORTING TEMPORAL CONSTRAINTS

CROSS-REFERENCE TO RELATED APPLICATION

This application is a 35 U.S.C. § 371 National Stage Application of PCT/EP2017/065802, filed on Jun. 27, 2017, which claims the benefit of U.S. Provisional Application No. 62/354,875, filed Jun. 27, 2016, the disclosures of which are herein incorporated by reference in their entirety.

FIELD

This disclosure relates generally to distributed computer systems and, more particularly, to an active activity planning system and method for supporting temporal constraints.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to an active activity planning system comprises a knowledge base, the knowledge base comprising TBox and ABox, a query processor for receiving a query including temporal constraints, and a temporal reasoned, wherein the query processor converts the query into a formal representation and output the formal representation to the temporal reasoner for computing the likelihood score of satisfying temporal constraints in the query. The formal representation is an abstract temporal constraint network (abstract TCN). The abstract TCN comprising timestamps $TCN_T$, Edges $TCN_E$, and Constraints $TCN_C$.

According to another aspect of the disclosure, a computer program product comprising a computer readable medium having computer readable program code for temporal reasoning, the computer program product comprises computer readable program code for obtaining timestamps $TCN_T$, Edges $TCN_E$, and Constraints $TCN_C$ and computer readable program code for obtaining possible shortest routes of least two of timestamps $TCN_T$, Edges $TCN_E$, and Constraints $TCN_C$.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Figure 1:
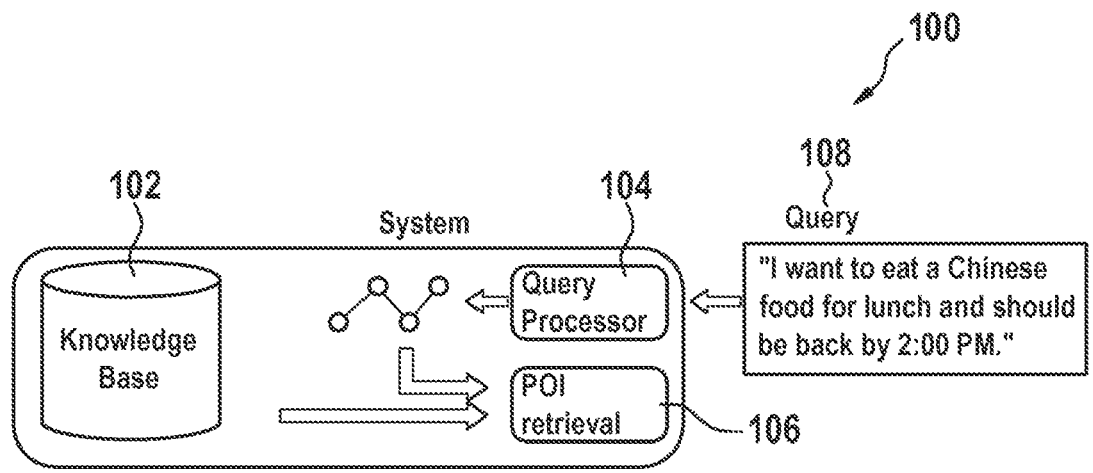
FIG. 1 is a block diagram illustrating an activity planning system for handling temporal reasoning.

FIG. 1 is a block diagram illustrating an activity planning system 100 for handling temporal reasoning. The activity planning system 100 comprises a knowledge base 102, a query processor 104, and a temporal reasoner 106. The knowledge base 102 defined as description logic comprises TBox and ABox. Further details of the knowledge base 102 will be described in FIG. 2. Now going back to FIG. 1, a query 108 including temporal constraints is input into the query processor 104. The query, for example, "I want to eat a Chinese food for lunch and should be back to the office by 2:00 pm." The query processor 104 converts the query into a formal representation. The formal representation is a formal graphical semantic representation grounded on an ontology defined in the knowledge base 102. The temporal reasoner 106 processes the query representation output by the query processor 104 against the knowledge base which defines a set of object such as restaurants and their properties such as a location, working hours, and so forth. For each object, the temporal reasoner 106 produces a normalized score from 0 to 1 to indicate the degree of how likely the object satisfies the temporal constraints imposed by the query 108. In other words, the temporal reasoned 106 automatically generates an activity plan including multiple point-of-interests (POIs) give temporal constraints. For example, the restaurant is far from the current location and is unlikely to satisfy the query 108 if the current time is close to 2:00 pm. 0 means that the object can never satisfy the constraints and 1 means that the object always satisfies the constraints.

Figure 2:
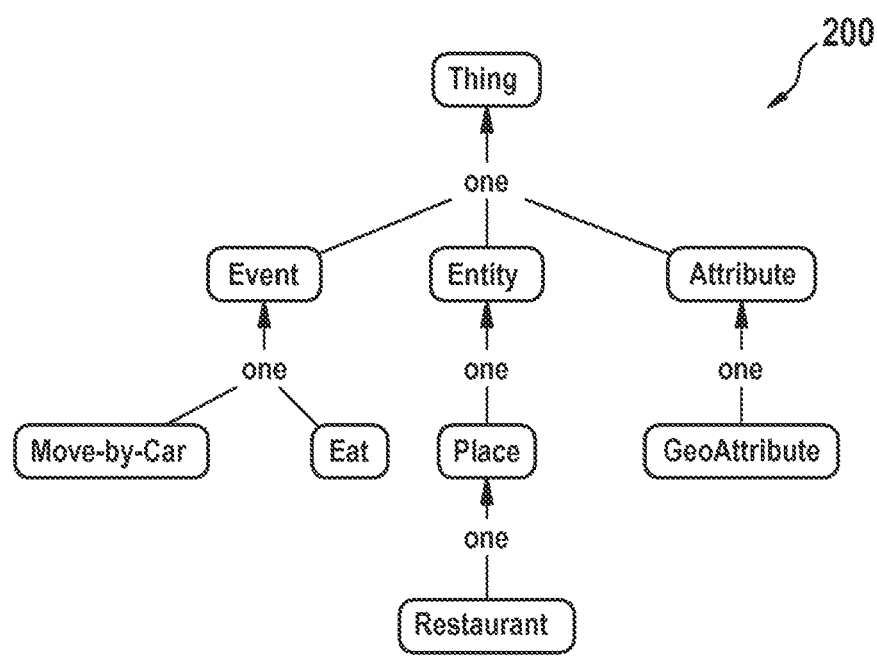
FIGS. 2 and 3 illustrate taxonomy trees $KB_{TR}$ of temporal relationships, its domain, and range constraints.
Figure 3:
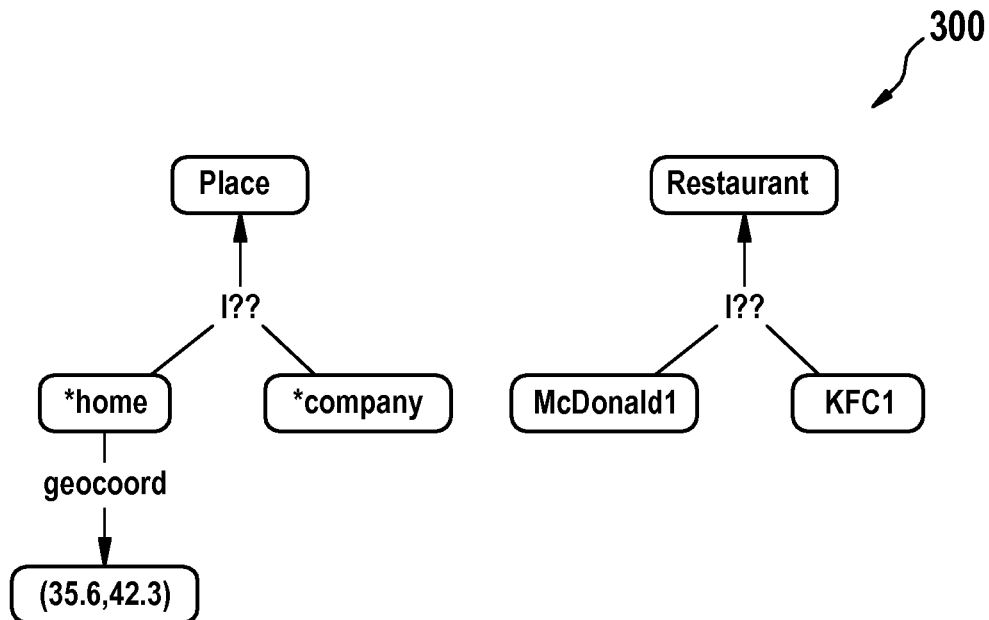

FIGS. 2 and 3 illustrate taxonomy trees $KB_{TR}$ of temporal relationships, its domain, and range constraints. The knowledge base 102 defined as description logic comprises TBox 200 in FIG. 2 and ABox 300 in FIG. 3. TBox 200 defines concepts and its inheritance relations and ABox 300 defines instances and assertions about the instances. Now referring to FIG. 2, an example of TBox 200 in a graphical notation is illustrated. $KB_C$ defines the concepts included in the knowledge base. In an example, $KB_C$ is a set of nodes such as Thing, Event, Move, Eat, Entity, Place, Restaurant, Attribute, GeoAttribute. $KB_R$ defines all possible relations that a pair of concepts can have, either direct or indirect subclass of Event, Entity or Attribute. $KB_{TR}$ defines the taxonomic relationship between the concepts such as (Thing, Event), (Thing Entity), and so forth. $KB_{RC}$ defines the selectional preference for the domain and range of each relation. In the example, the domain of origin is Event and its subclass whereas the range is Entity and its subclass. At the top of the taxonomy tree, the top two level is fixed as a default defined as $KB_C$ where Thing is a root node and Event, Entity, and Attribute are a direct subclass of Thing. Every event concept defines a starting time (starting_time) and an ending time (ending_time) as its default slots. The two slots, starting_time and ending_time, are used when a user specifies temporal constrains. Every event concept further defines duration as its default slot, which provides a link to a user-defined duration function that calculates the estimated duration of the event. For example, for the Eat concept, the duration function may return [30, 60] for the peak time and [20, 40] for the others. The interval notation [30, 60] represents that the total time taken for eating is estimated to be between 30 and 60. The duration function varies, depending on the type of restaurant such as fast food vs sit-down restaurant. A set of instructions stored in a computer readable medium causes the temporal reasoner 106 of FIG. 1 to support interval-based duration representation and normal-distribution based duration representation. Every event concept has a duration slot which provides a link to a user-defined duration function. The output of the duration function is either a pair of (1,u) for the interval representation (to denote [1,u]) or a set of parameters for the probability-based representation, for example, a pair of $(\mu, \sigma)$ for the Gaussian distribution representation (to denote $N(\mu, \sigma^2)$).

Now referring to FIG. 3, an example of ABox 300 in a graphical notation is illustrated. ABox 300 defines as (Instances $KB_I$, Propositions $KB_P$). $KB_I$ defines instances and $KB_P$ defines the assertions about the instances. For example, $KB_I$ is {*home, *company, McDonald1, KFC12} and $KB_P$ is {(*home, isa, PlaCE), . . . , (*home, geocoord, (35.6, 42.3), . . . }. All instances defined in ABox is an instance of Entity.

Figure 4:
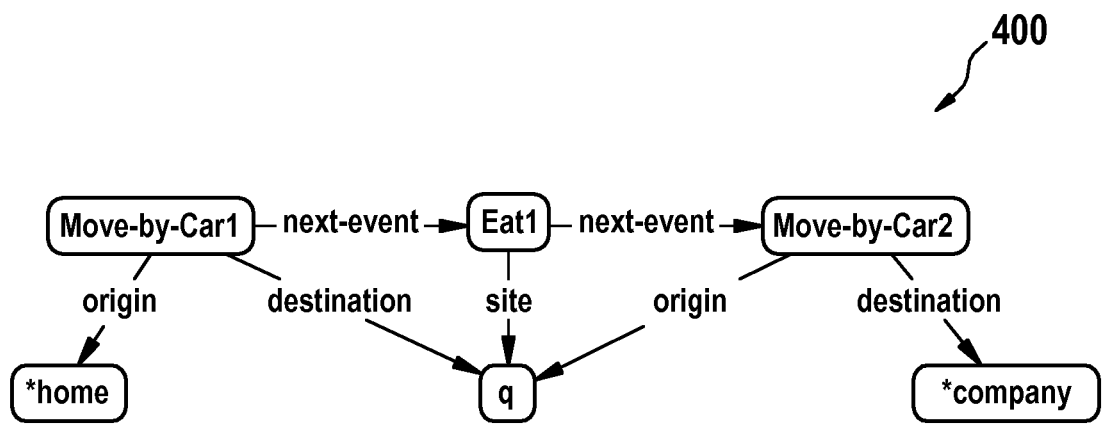
FIG. 4 illustrates a block diagram of an example of a query comprises of a graphical semantic representation and temporal constraints.

FIG. 4 illustrates a block diagram of an example of a query 400 comprises of a graphical semantic representation and temporal constraints. The query 400 is defined as a 5-tuple, (Instances $Q_1$, Node Typing $Q_{NT}$, Propositions $Q_{PR}$, Constraints $Q_C$, queried nodes $Q_Q$). $Q_1$ represents a set of the instances used in the query. $Q_{NT}$ represents the types of the instances. $Q_{PR}$ is a set of the triples defining the relationship between the instances. $Q_C$ represents a set of the temporal constraints that are an inequality condition for a timestamp variable. $Q_Q$ is a set of the instances that are to be queried. An example of the query "I have to arrive at my company between 2:20 pm and 3:10 pm. On the way, I would like to eat a food. Please recommend a restaurant." The instances of the Entity are drawn from the ABox of the KB (e.g., *home, *company) and the event instances $Q_1$ are a solemnized instance of an event concept (e.g. Move-by-Car1, Eat1, Move-by-Car2). One special node is a queried node q which denotes an object to be queried. In an example "14:20"≤Move-by-Car2.ending_time≤"15:10", the arrival time between 2:20 pm and 3:10 pm at the company are the temporal constraints $Q_C$ to be observed.

Figure 5:
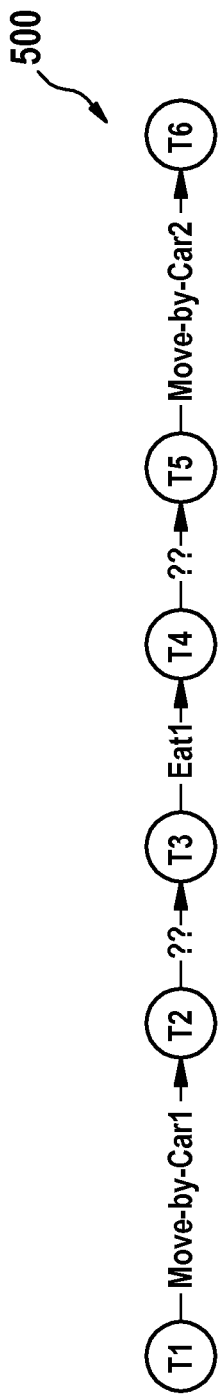
FIG. 5 illustrates a probability distribution representation of an abstract temporal constraint network (abstract TCN) converted by a temporal reasoner from a query depicted in FIG. 4.

FIG. 5 illustrates a probability distribution representation of an abstract temporal constraint network (abstract TCN) 500 converted by a temporal reasoner from a query 400 depicted in FIG. 4. The duration information such as the duration of Move-by-Car1 is underspecified. For each candidate object, the abstract TCN 500 is specialized into a representation where the underspecified duration information is filled with concrete duration representations. The activity planning system 100 uses abstract TCN to compute the likelihood of the object satisfying the temporal constraints. An abstract TCN is defined as a triple, (Timestamps $TCN_T$, Edges $TCN_E$, Constraints $TCN_C$). $TCN_T$ represents a set of timestamp variables each of which corresponds to the starting_time or ending_time slot of each event. For example, $T_1$ and $T_2$ correspond to Move-by-Car1.starting_time and Move-by-Car1.ending_time, respectively. $TCN_E$ represents a set of edges. For example, {($T_1$, Move-by-Car1, $T_2$), ($T_2$,≤,$T_3$), ($T_3$, Eat1,$T_4$), ($T_4$,≤,$T_5$), ($T_5$, Move-by-Car2, $T_6$)}. The edge is annotated with a label, which us either an event instance name or ≤(as in $T_i$,≤,$T_j$) represents that $T_j$ occurs after $T_i$. $TCN_C$ represents a set of constraints imposed on $TCN_T$.

To generate the abstract TCN from the query representation 400 illustrated in FIG. 4, for each event, two timestamp variables are created and connected with an edge with the event name as a label. For (ev1, next-event, ev2) in the query, an edge is created to connect $T_i$ and $T_j$ where $T_i$ and $T_j$ are the timestamp variables corresponding to ev1.ending_time and ev2.starting_time, respectively. The constraints in the query are then converted by replacing the starting_time and the ending_time slots with the timestamp variables. For each object, the temporal reasoner creates a TCN from a given abstract TCN by replacing the edge labels, e.g. the event instance names and ≤ with the interval $([1,u])^3$ or a probability distribution $N(\mu, \sigma^2)$.

Figure 6:
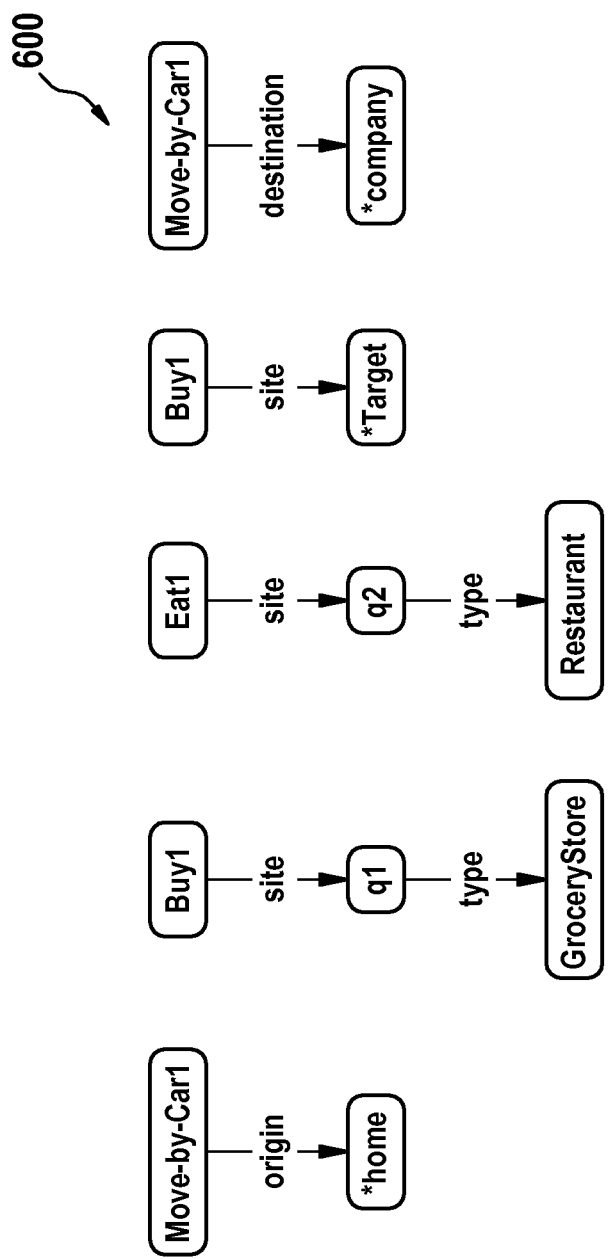
FIG. 6 illustrates an interval distribution representation of an abstract temporal constraint network (abstract TCN) where the edge labels are replaced with the duration representation such as an interval distribution.

FIG. 6 illustrates an interval distribution representation of an abstract temporal constraint network (abstract TCN) 600 where the edge labels are replaced with the duration representation such as an interval distribution. Various sets of instructions may be provided to retrieve a single POI instance given the temporal constraints. In one embodiment, algorithm 1 is provided below for reasoning on an interval-based TCN.

---

ALGORITHM 1: Reasoning on the interval-based TCN for each timestamp variable $T_i$ where $T_i$'s parent variables, $T_{i1},...,T_{im}$, are marked with the intervals, $[l_1,u_1],...,[l_n,u_n]$ do
    let $[q_k,r_k]$ be the interval on the edge between $T_i$ and $T_{ik}$
    set $T_i$'s interval as $[\max_k(l_{ik} + q_k), \max_k(u_{ik} + r_k)]$
end for
Perform constraint check

---

Where the latest possible time for $T_i$ is $\max_k(u_{ik}+r_k)$ and $[l_1, u_1], \ldots, [l_n, u_n]$ are edge labels.

In another embodiment, algorithm 2 is provided below for reasoning on the Normal-distribution based TCN.

ALGORITHM 2: Reasoning on the Normal-distribution based TCN
(tree, single constraint)

for each timestamp variable $T_i$ where its parent $T_j$ is marked with $(\mu_j, \sigma_j)$
do
   let $[\mu_e, \sigma_e]$ be labeled on the edge between $T_i$ and $T_j$
   mark $T_i$ as $(\mu_j + \mu_e, \sigma_j^2 + \sigma_e^2)$
end for
Compute the likelihood score for the interval of a timestamp indicated by the constraint.

In another embodiment, algorithm 3 is provided below for reasoning on a probability-based TCN on general case using sampling to stimulate the query and compute faction of the samples that satisfy the constraints.

ALGORITHM 3: Reasoning on the general case for each timestamp variable $T_i$ where the samples is drawn for its parents $T_{i1},...,T_{in}$ do
   Draw a sample for $T_i$
end for
Repeat the above sampling step and count what fraction of the samples satisfy the constraints.

Unlike from the earlier described algorithms, algorithm 4 provided below is capable of retrieving multiple POIs without specifying the order of visit.

ALGORITHM 4: Algorithm for retrieving multiple POIs without specifying the order of visit backbone_route = compute_backbone_route( )
state_space = create_state_space(starting_node) //creates a state space with the starting_node as a root level_cnt = 1
// the state space tree is constructed until the depth is equal to the total number of the POIs given as an input
while level_cnt ≤ total number of POIs to visit do
   leaf_nodes = state_space.get_leaf_nodes( )
   for leaf_node in leaf_nodes do
     expanded_nodes = expand_leaf_node(leaf_node) // expand a leaf node
     state_space.add_new_state(leaf_node, expanded_node)
   end for
   level_cnt += 1
end while
choose the final top K routes An example of an extended query 600 is illustrated in FIG. 6. The extended query 600 allows multiple objects to be queried, e.g. $Q_Q$ has multiple elements {q1,q2}. The order of the events is unspecified. The next-event is omitted and that the query 600 is fragmented into individual event representations. Also, the Move event instances needed to visit q1, q2 and *target are also omitted. Specific POIs, e.g. *Target in the query are provided to indicate the must-visit locations.

Figure 7:
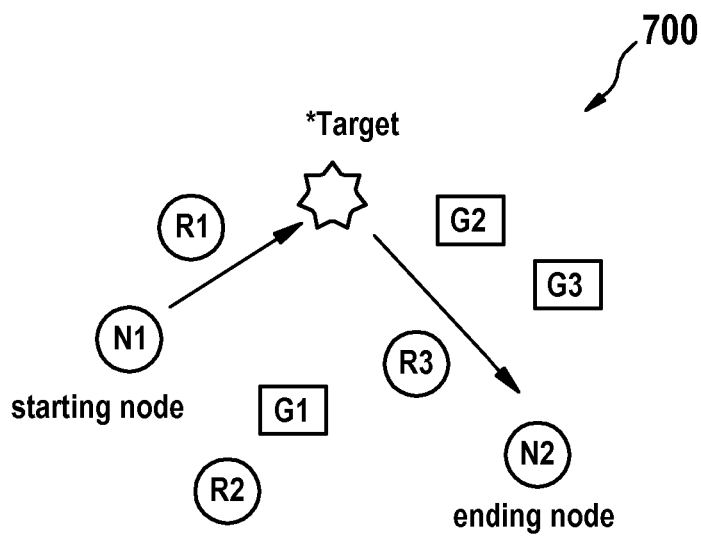
FIG. 7 illustrates an example of a map.
Figure 8:
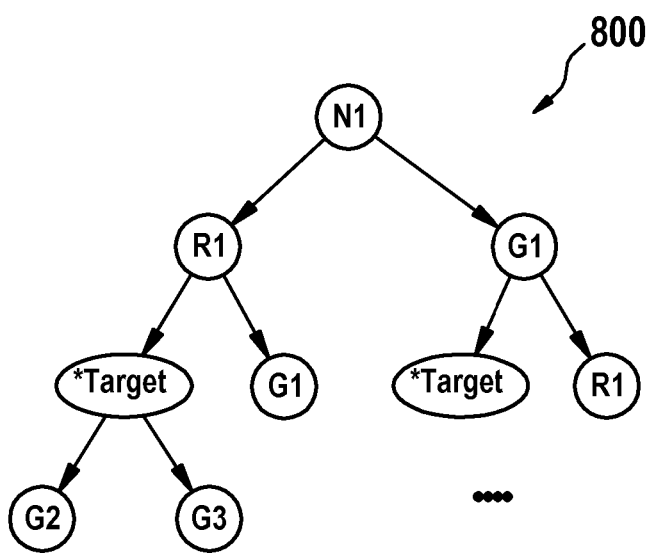
FIG. 8 illustrates a state-space search tree.

FIG. 7 illustrates an example of a map 700. The extended reasoning algorithm 4 first computes shortest routes only with the must-visit places. Which is to say, only POIs near the backbone route are identified. Once the backbone route is detected, the final routes which include the POIs specified by the user are constructed as now illustrated in FIG. 8 as a state-space search tree.

$$\min_i dist(s, \overline{(a_i, b_i), (a_{i+1}, b_{i+1})}) \tag{1}$$

Eq. 1 indicates the shortest distance between s and the backbone route is the minimum over the shortest distances between s and each line segment defined by $(a_i, b_i)$ and $(a_{i+1}, b_{i+1})$.

Let $(p_i, q_i)$ be a projected coordinate of s onto the extended line segment between $(a_i, b_i)$ and $(a_{i+1}, b_{i+1})$ as shown in Eq. 2.

$$dist(s, \overline{(a_i, b_i), (a_{i+1}, b_{i+1})}) = \tag{2}$$

$$\begin{cases} dist(s, (p_i, q_i)) & \text{if } (p_i, q_i) \text{ is within the line segment} \\ \min(dist(s, (a_i, b_i)), \\ dist(s, (a_{i+1}, b_{i+1}))) & \text{otherwise} \end{cases}$$

$(p_i, q_i)$ is $(a_i + u(a_{i+1} - a_i), b_i + u(b_{i+1} - b_i))$ where[9]

$$u = \frac{(s_x - a_i)(a_{i+1} - a_i) + (s_y - b_i)(b_{i+1} - b_i)}{(a_{i+1} - a_i)^2 + (b_{i+1} - b_i)^2}$$

It can be easily checked if $(p_i, q_i)$ is within the line segment defined by $(a_i, b_i)$ and $(a_{i+1}, b_{i+1})$ if and only if $(p_i, a_i)*(p_i-a_{i+1}) \leq (q_i-b_i)*(q_i-b_{i+1}) \leq 0$.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the spirit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An active activity planning system comprising:
   a knowledge base comprising (i) a set of concepts and inheritance relations ("TBox"), and (ii) a set of instances and assertions about the instances ("ABox");
   a query processor for receiving a query from a user, the query including at east one temporal constraint and at least one target; and
   a temporal reasoner;
   wherein the query processor is configured (i) to convert the received query into a formal representation, and (ii) to output the formal representation to the temporal reasoner,
   wherein the instances of the ABox include a current location of the user and a plurality of points of interest ("POI") corresponding to the at least one target, and
   wherein the temporal reasoner is configured to process the formal representation against the knowledge base and the at least one temporal constraint to compute a likelihood score for each POI corresponding to the at least one target,
   wherein the likelihood score indicates a likelihood that the corresponding POI satisfies the at least one temporal constraint included in the query, and
   wherein a shortest route is determined from the current location to a selected POI based on the likelihood score, such that the user can achieve the at least one target within the at least one temporal constraint.

2. The active activity planning system of claim 1 wherein the formal representation is an abstract temporal constraint network ("abstract TCN").

3. The active activity planning system of claim 2 wherein the abstract TCN comprises temporal constraint network timestamps ("$TCN_T$"), temporal constraint network edges ("$TCN_E$"), and temporal constraint network constraints ("$TCN_C$").

4. The active activity planning system of claim 1, wherein:
   the likelihood score is a normalized score from 0 to 1,
   a normalized score of 0 indicates that the POI never satisfies the at least one temporal constraint, and
   a normalized score of 1 indicates that the POI always satisfies the at least one temporal constraint.

5. The active activity planning system of claim 1, wherein:
   the at least one temporal constraint corresponds to a time that the user must return to the current location,
   the likelihood score is based on a typical amount of time spent at the corresponding POI, and
   the selected POI is selected (i) to provide the user with time to travel to the selected POI from the current location along the shortest route, (ii) to spend the typical amount of time at the selected POI, and (iii) to travel from the selected POI back to the current location along the shortest route.

* * * * *